United States Patent
Khazma et al.

(10) Patent No.: US 11,106,674 B2
(45) Date of Patent: Aug. 31, 2021

(54) EXTENSIBLE DATA SKIPPING

(71) Applicant: International Business Machines Corporation, Armonk, NY (US)

(72) Inventors: Guy Khazma, Ramat Gan (IL); Gal Lushi, Kiryat Ono (IL); Paula Ta-Shma, Tel Aviv-Jaffa (IL)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 16/371,019

(22) Filed: Mar. 31, 2019

(65) Prior Publication Data

US 2020/0311088 A1    Oct. 1, 2020

(51) Int. Cl.
*G06F 16/00*     (2019.01)
*G06F 16/2455*   (2019.01)
*G06F 16/903*    (2019.01)
*G06F 16/9032*   (2019.01)

(52) U.S. Cl.
CPC .... *G06F 16/24553* (2019.01); *G06F 16/9032* (2019.01); *G06F 16/90335* (2019.01)

(58) Field of Classification Search
CPC .......... G06F 16/24553; G06F 16/9032; G06F 16/90335; G06F 16/2282; G06F 16/24534
See application file for complete search history.

(56) References Cited

U.S. PATENT DOCUMENTS

| | | | |
|---|---|---|---|
| 2011/0047144 A1* | 2/2011 | Han | G06F 16/24532 707/718 |
| 2012/0150922 A1* | 6/2012 | Yalamanchi | G06F 16/24564 707/812 |
| 2013/0138666 A1* | 5/2013 | Muller | G06F 16/24549 707/754 |
| 2016/0283140 A1 | 9/2016 | Kaushik et al. | |
| 2017/0308572 A1 | 10/2017 | Finlay et al. | |
| 2018/0011690 A1 | 1/2018 | Kaushik et al. | |
| 2018/0060365 A1 | 3/2018 | Mujumdar et al. | |

OTHER PUBLICATIONS

Sun et al., Fine-grained Partitioning for Aggressive Data Skipping, SIGMOD '14 Proceedings of the 2014 ACM SIGMOD International Conference on Management of Data, pp. 1115-1126.

\* cited by examiner

*Primary Examiner* — Dinku W Gebresenbet
(74) *Attorney, Agent, or Firm* — Gregory J. Kirsch

(57) ABSTRACT

Techniques for data skipping that may be user defined and extensible may be provided. A method may include receiving a query, at a computer system comprising a processor, memory accessible by the processor, and computer program instructions stored in the memory and executable by the processor, modifying, at the computer system, the received query to utilize at least one data skipping index to evaluate at least one criterion of the query, wherein the at least one data skipping index comprises an index on at least one attribute of data that excludes index information for at least a portion of those data items that do not meet the at least one criterion, and wherein the at least one data skipping index is generated based on information received from an application programming interface, and evaluating, at the computer system, the query.

17 Claims, 16 Drawing Sheets

EXTENSIBLE DATA SKIPPING

BACKGROUND

The present invention relates to providing data skipping techniques that may be user defined and extensible.

Data skipping is a technique used for big data analytics on structured data. For example, tabular data (comprising multiple rows) may involve summary metadata being stored for row subsets. This summary metadata can be used to determine that a row subset is irrelevant to a query (such as in SQL) and therefore can be skipped during query processing. This results in significant performance improvements and cost reductions.

Conventionally, data skipping is applied to structured data and is typically stored per column and works when, for example the column is numeric, such as integer or float, and the query predicate is one of, for example, $\{<, \leq, >, \geq, =\}$. In this case the summary metadata used is the minimum and maximum values for a column. Another example is when the column is numeric or string and the query predicate is one of for example, $\{=, IN\}$. In this case the summary metadata used is a list of values or a bloom filter.

Conventional data skipping may be useful, but is confined to a relatively limited set of uses. A need arises for techniques that may provide data skipping in additional circumstances, which may be user defined and extensible, and may be applied to structured, semi-structured, or unstructured data.

SUMMARY

Embodiments of the present systems and methods may provide techniques for data skipping that may be user defined and extensible. For example, extensible data skipping may define appropriate application programming interfaces (APIs) that enable developers to add new types of summary metadata, which can be used for data skipping in conjunction with arbitrary predicates. Such predicates may be built into SQL. For example, $\{LIKE, <=\}$, etc., or they may be User Defined Functions (UDFs). Extensible data skipping may provide for queries involving UDFs or built in predicates other than the ones listed above $\{<, <=, >, >=, =, IN\}$.

Moreover, extensible data skipping APIs may allow specifying how combinations of predicates, such as using AND/OR/NOT, should map to combinations of summary metadata types. This may provide data skipping using arbitrarily complex predicates.

For example, in an embodiment, a method may comprise receiving a query, at a computer system comprising a processor, memory accessible by the processor, and computer program instructions stored in the memory and executable by the processor, modifying, at the computer system, the received query to utilize at least one data skipping index to evaluate at least one criterion of the query, wherein the at least one data skipping index comprises an index on at least one attribute of data that excludes at least a portion of those data items that do not meet the at least one criterion, and wherein at least one of the at least one data skipping index and/or the mapping from the at least one criterion to the at least one data skipping index is generated based on information received from an application programming interface, and evaluating, at the computer system, the query.

In embodiments, the at least one data skipping index may be generated by receiving from the application programming interface, at the computer system, information defining a data skipping index type, receiving from the application programming interface, at the computer system, information interpreting the at least one criterion, generating, at the computer system, metadata relating to the defined data skipping index type and the defined at least one criterion, and generating, at the computer system, the at least one data skipping index based on the generated metadata. The received query may be represented as an expression tree, and the expression tree may be modified by utilizing an optimization rule to label at least one node of the expression tree with a Clause representing the skipping requirements for at least one criterion and referring to at least one data skipping index. The at least one criterion may be a Structured Query Language (SQL) predicate. The at least one data skipping index may be generated by receiving from the application programming interface, at the computer system, information defining a plurality of data skipping index types, receiving from the application programming interface, at the computer system, information defining a plurality of criteria, generating, at the computer system, metadata relating to each defined data skipping index type and each defined criterion, combining, at the computer system, the metadata relating to each defined data skipping index type and each defined criterion to form metadata relating to the plurality of defined data skipping index types and the plurality of defined criteria, and generating, at the computer system, the at least one data skipping index based on the generated metadata. The received query may be represented as an expression tree, and the expression tree is modified by utilizing a plurality of optimization rules to label each of a plurality of nodes of the expression tree with a Clause representing skipping requirements for a criterion and referring to a data skipping index. Each criterion may be a Structured Query Language (SQL) predicate.

In an embodiment, a system may comprise a processor, memory accessible by the processor, and computer program instructions stored in the memory and executable by the processor to perform: receiving a query, modifying the received query to utilize at least one data skipping index to evaluate at least one criterion of the query, wherein the at least one data skipping index comprises an index on at least one attribute of data that excludes at least a portion of those data items that do not meet the at least one criterion, and wherein at least one of the at least one data skipping index or a mapping from the at least one criterion to the at least one data skipping index is generated based on information received from an application programming interface, and evaluating the query.

In an embodiment, a computer program product may comprise a non-transitory computer readable storage having program instructions embodied therewith, the program instructions executable by a computer, to cause a computer to perform a method comprising: receiving a query, modifying the received query to utilize at least one data skipping index to evaluate at least one criterion of the query, wherein the at least one data skipping index comprises an index on at least one attribute of data that excludes index information for at least a portion of those data items that do not meet the at least one criterion, and wherein at least one of the at least one data skipping index or a mapping from the at least one criterion to the at least one data skipping index is generated based on information received from an application programming interface, and evaluating the query.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques for data skipping that may be user defined and extensible.

Embodiments of the present systems and methods may provide techniques for data skipping that may be user defined and extensible. For example, extensible data skipping may define appropriate application programming interfaces (APIs) that enable developers to add new types of summary metadata, which can be used for data skipping in conjunction with arbitrary predicates. Such predicates may be built into SQL. For example, LIKE, <=etc., or they may be User Defined Functions (UDFs). Extensible data skipping may provide for queries involving UDFs or built in predicates other than the ones listed above (<, <=, >, >=, =, IN).

The present techniques may provide extensible data skipping for arbitrary SQL predicates. Examples may include support for AND/OR/NOT predicates, Support User Defined Functions (UDFs), support additional predicates, such as LIKE, and support for complex SQL expressions. The present techniques may define a generic mechanism to specify data skipping optimization rules, which may provide the capability for easy addition of optimization rules and which may be extended by users, for example, to handle new UDFs. The present techniques may provide a level of abstraction between the metadata store and the skipping framework, which provides the capability to be agnostic to the metadata store, and may allow easy integration of new metadata stores.

Figure 1:
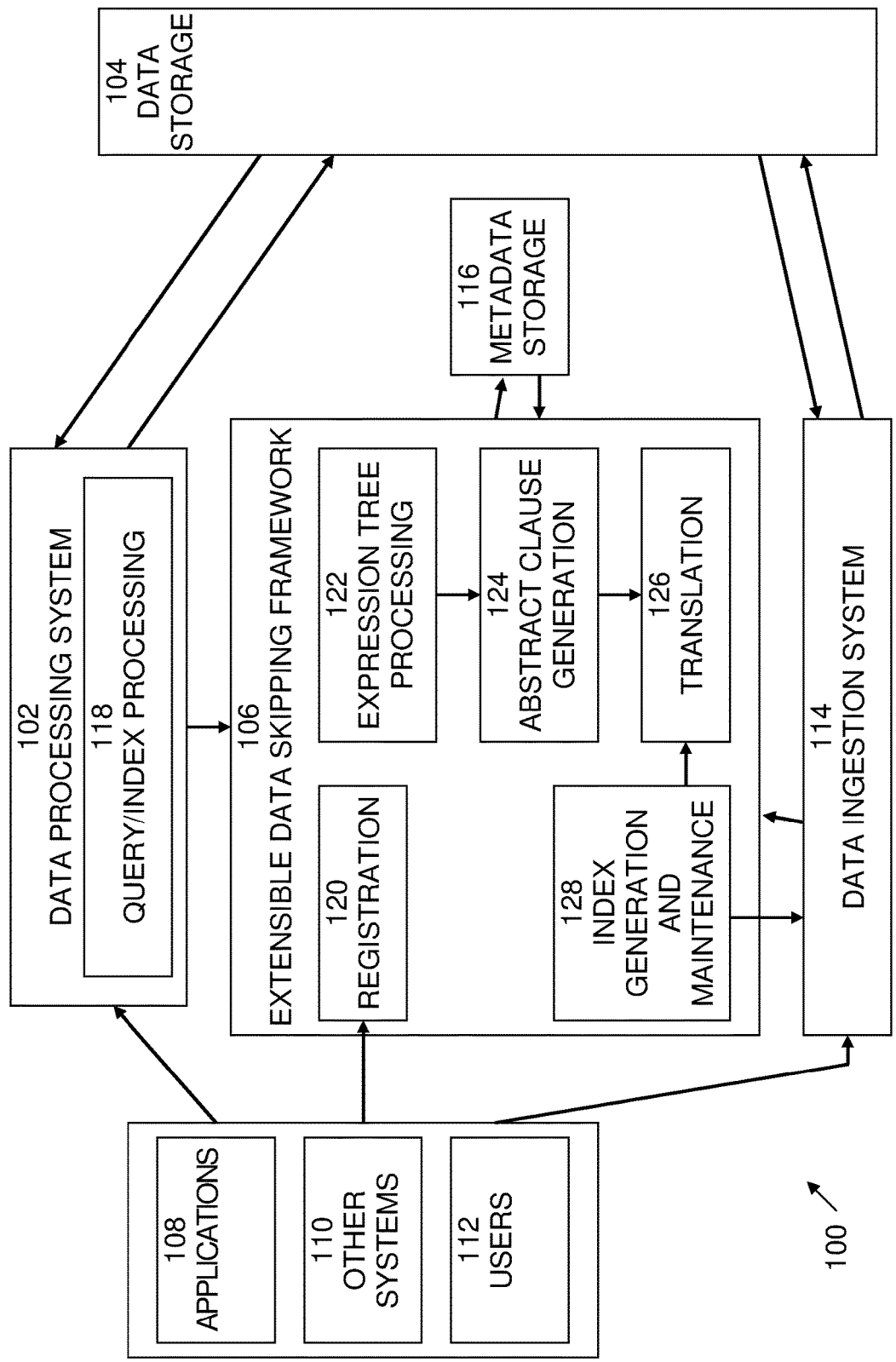
FIG. 1 illustrates an exemplary system in which the embodiments of the present systems and methods may be implemented.

An exemplary system 100 in which embodiments of the present systems and methods may be implemented is shown in FIG. 1. In this example, system 100 may include data processing system 102, data storage 104, extensible data skipping framework 106, applications 108, other systems 110, users 112, data ingestion system 114, and metadata storage 116. Data processing system 102 may include hardware and software for processing structured big data. Data processing system may be, or may include, one or more database management systems (DBMSs), as well as additional hardware and software for processing structured big data. DBMSs are merely one example of a system that may be included. Other systems such as Hadoop, Spark, Presto etc., are additional examples of the types of systems that may be used by and included Data processing system 102. Embodiments of the present systems and methods may be advantageously applied to executing database or other queries directly on big datasets, which may reside in object storage or in a file system (not in a database system). Data skipping indexes may reduce the amount of data which needs to be scanned in this case and can turn a non-feasible query into a feasible one. Data processing system 102 may include query/index processing 118, which may handle processing of database or other processing queries, using data skipping indexes in processing the queries. Data storage 104 may include hardware and software for storing data that is created, retrieved, updated, managed, or otherwise processed by data by data processing system 102.

Extensible data skipping framework 106 may provide the capability for developers to add support for new types of summary metadata to support new data skipping index types and to specify how predicates used in a query may map to summary metadata in order to evaluate whether data can be skipped. Extensible data skipping framework 106 may include registration 120, expression tree processing 122, abstract clause generation 124, translation 126, and index generation and maintenance 128. Registration 120 may provide the capability to extending the system by adding support for new UDFs and Metadata Index Types in extensible data skipping framework 106 using an extensible data skipping API. Expression tree processing 122 may accept a query expression, for example in expression tree form, but also in SQL form, and perform metadata processing of the query expression so that abstract clause generation 124 may generate an abstract representation of a clause that refers to the relevant data skipping indexes. Translation 126 may translate the abstract clause to form a metadata representation of the clause that refers to the relevant data skipping indexes. The metadata representation may be stored in metadata storage 116. Index generation and maintenance 128 may generate and maintain the data skipping indexes.

Predicate specification may ultimately output filters, which may provide filtering of data using data skipping. For example, predicate specification may allow specifying how combinations of predicates, such as using AND/OR/NOT, should map to combinations of summary metadata types.

This may provide data skipping using arbitrarily complex predicates. For example, extensible data skipping framework 106 may provide the capability to add support for new types of summary metadata to support new data skipping index types and to specify how predicates used in a query map to summary metadata in order to evaluate whether data can be skipped.

Extensible data skipping framework 106 may be implemented as accessible to applications 108, other systems 110, and users 112. Extensible data skipping framework 106 may be used to generate data skipping indexes using index generation and maintenance 128. The data skipping indexes, when generated, may be in the form of metadata, which may be stored with data 122 itself in data storage 104, or separately in data storage 104. In contrast to conventional database table indexes, which include index information for every data item in a data table, data skipping indexes include summary index information for groups of data items, and can be used to ascertain that those data items do not meet certain criteria.

Data ingestion system 114 may receive data to be processed from applications 108, other systems 110, and users 112, process the received data, and store it in data storage 104.

Metadata storage 116 may store metadata defining the data types and data skipping indexes, and may support pluggable configuration of the different data types and indexes. For example, metadata storage 116 may be implemented using the Elastic Search (ES) search engine, but support for additional metadata stores may be added in an extensible way.

In order to generate an effective data skipping index, the summary metadata should be significantly smaller than the data and the mapping should have no false negatives (whenever data is skipped, it is certain that there were no relevant rows). However false positives are acceptable. For example, for geospatial data skipping a developer could add bounding box summary metadata which summarizes the set of geospatial points in a row subset. Note that bounding box metadata is much smaller than the data itself. In this example, mappings for UDFs such as ST_distance (geospatial distance) to bounding box summary metadata may be defined.

For example, consider a query looking for data points within 10 kilometers of La Guardia airport. (This query may use the ST_distance UDF). This specifies a circle with radius 10 km around that point. This circle may be squared and bounding box summary metadata which does NOT overlap the square may be generated. The corresponding row subsets can safely be skipped (note there are no false negatives here).

By using these APIs, support may be added for application specific UDFs and/or data types without requiring any change to the analytics engine or the data skipping library. For example new data skipping indexes can be added for 1) geospatial data, 2) astronomical data, 3) genomic data, 4) image data, etc. Conventionally, data skipping is not supported for queries involving UDFs or for application specific data types. In embodiments, the present systems and methods may be applied to structured, semi-structured, or unstructured data. Data skipping may be extended to any type of data, whether organized into databases or other collections of data. In one embodiment, the data may be divided into objects with associated metadata.

For example, embodiments of the present systems and methods may be applied to image data, such as a collection of photos where the user defined metadata is a thumbnail for each photo. In such embodiments, queries may provide the capability to skip the photos where processing the thumbnail can ensure that the original photo doesn't have the properties that are being sought. For example, a query may search for photos of cats, so embodiments may provide the capability to skip over other animals/objects when processing the thumbnail can ascertain that the original image is not a cat, etc.

Conventional systems that allow optimization rules to be added in an extensible manner do not provide support for data skipping so adding data skipping support for a specific data type/set of UDFs is a difficult task. Supporting data skipping in an extensible fashion includes important properties of data skipping indexes, such as no false negatives. Such properties are different from those of regular database indexes (which are typically just as large as the data itself and so not useful for data skipping).

The present techniques may provide the capability to independently implement data skipping APIs and to combine their input to allow data skipping in some cases where the input of each one individually might not have been sufficient to allow data skipping. For example, if a dataset has both geospatial and time series columns, different developers may independently implement data skipping APIs for each of these data types. Using the present techniques, a query involving a predicate "P1 OR P2", where P1 involves the geospatial columns and P2 involves the time series columns, may skip data by combining both API implementations.

Figure 2:
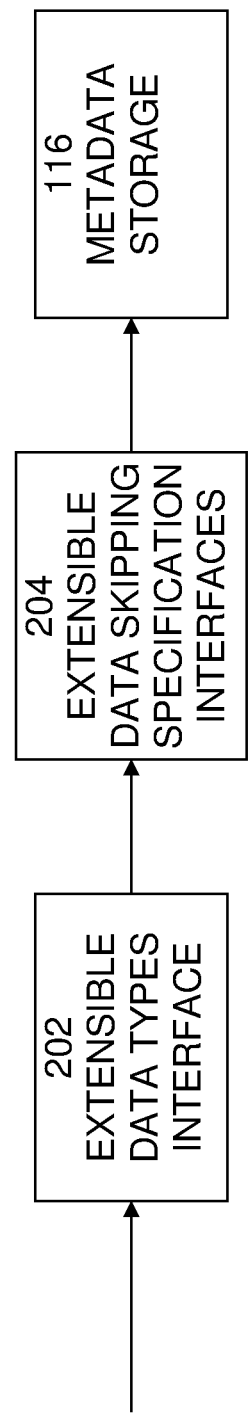
FIG. 2 is an exemplary diagram of extensible data skipping interfaces according to embodiments of the present systems and methods.

An example of interfaces that may be included in extensible data skipping framework 106 is shown in FIG. 2. In this example, the interfaces may include one or more sets of extensible data types interface 202, one or more extensible data skipping specification interfaces 204, and may utilize metadata storage 116. Extensible data types interface 202 may provide the capability to define one or more data types for which data skipping may be implemented. For example, extensible data types interface 202 may provide the capability to specify a new MetaDataType, which is a logical representation of summary metadata. Examples of such data types may include Geo-spatial data, such as GPS coordinates, street addresses, etc., Astronomical data, such as astronomical coordinates, etc., and Genomic data, such as DNA/protein sequences, etc.

Extensible data skipping specification interfaces 204 may provide the capability to add new data skipping index types (MetaDataType) for the data types included in extensible data types 202. For example, Geospatial data may use a 2D bounding box data skipping index type, Astronomical data may use a 3D structure data skipping index type, and Genomic data may use bloom filter/trie search tree filter on sequence data. Extensible data skipping specification interfaces 204 may include a Metadata Generation interface providing the capability to transform a representation of a row subset, such as a Spark DataFrame, to a MetaDataType defined by extensible data types interface 202. Further, extensible data skipping interfaces 204 may include a translation interface where the logical representation of summary metadata may be translated to a physical representation, dependent on the specific metadata store used, and may be stored in metadata stores 206. Once the above-described data is defined, a data skipping index for a given dataset may be created.

Figure 3:
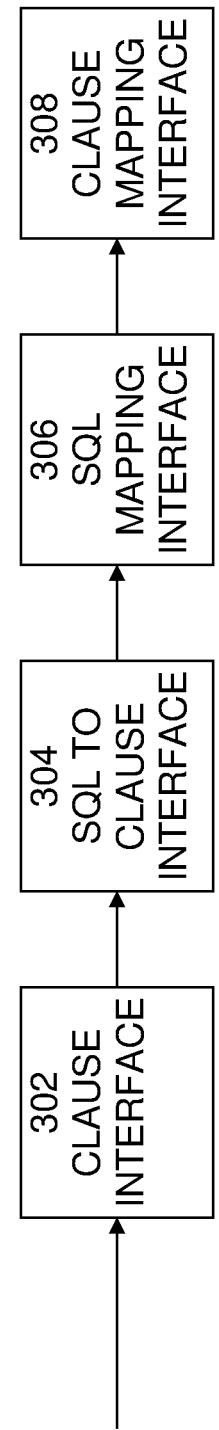
FIG. 3 is an exemplary diagram of predicate specification interface according to embodiments of the present systems and methods.

An example of clause generation 124 is shown in FIG. 3. Clause generation 124 may be used to specify how predicates used in a query are mapped to summary metadata in order to evaluate whether data can be skipped. Clause generation 124 may include API interfaces, such as clause interface 302, SQL to clause interface 304, SQL mapping interface 306, and clause mapping interface 308. The term "Clause" may be defined, which applies to an object (e.g., file) and returns a Boolean value. A clause c "represents" a (Boolean valued) query expression e, if, whenever an object contains a row that satisfies e, then the object satisfies c. This means that if an object (its row subset) does not satisfy clause c, the object may be skipped. More formally, a clause is a Boolean function c: $U \rightarrow \{0,1\}$, where U denotes the universe of possible files. Let e denote an expression (more specifically, a Boolean expression), a clause c Represents e (denoted by $c \, ^{?} \, e$) if the following holds: $\forall f \in U: (\exists r \in f. \, e(r)) \Rightarrow c(f)$. If a file contains a row that satisfies e, then the file satisfies c. This ensures that if the file does not satisfy c, then it contains no relevant data for the query. Accordingly, if a clause is built that represents the query expression, all the files that don't satisfy this clause can be skipped safely.

For example, a clause may be defined as MaxClause(age, >,5), which represents age>5. Whenever an object has a row with age>5, it has a maximum age>5. Then, if the maximum age for the object does NOT exceed 5, the object may be skipped. This property may be used to guarantee no false negatives.

Clause interface 302 may provide the capability to define appropriate clauses for metadata. SQL to clause interface 304 may provide the capability to map SQL query expressions to clauses which represent them. These query expressions may contain user-defined functions (UDFs). SQL mapping interface 306 may provide the capability to specify how to recursively map complex SQL query expressions based on simpler expressions. For example, SQL mapping interface 306 may be used to specify how to handle AND, OR and NOT. Default implementations, for example, for AND and OR, may be provided, but default implementations may be overridden. Typically NOT may be implemented in cases where there are also no false positives, but this is not always the case.

This recursive construction depends on the available metadata indexes for the dataset. It is possible that more than one metadata index is available and can be applied. This increases opportunities for data skipping, since data can be skipped as a result of any single metadata index providing skipping justification.

Clause mapping interface 308 may provide the capability to map from clauses to code/a query or search specification in the corresponding Metadata Store, such as ES. For the case of ES, this will result in a search for objects which can be skipped.

Predicate specification interface 116 may be used to define all the parts, data skipping may be applied to complex query expressions, involving those UDFs specified in SQL to clause interface 304, and handling those complex expressions specified in SQL mapping interface 306. This data skipping may be applied relative to the available data skipping indexes for the dataset, as defined above.

The present techniques may provide a number of optimization rules (Filters). In this context, an "optimization rule" (Filter) is an algorithm that operates on an expression, and labels the expression tree nodes with the clause, such that each node it labels is labeled with a clause that represents the node. This list may be altered at run time, based on external rule registration (via a dedicated registration API) and based on the existing metadata (rule that needs metadata that was not collected will not be applied). During query time, all the filters may be applied to the query expression. The results from all filters may be merged to create an abstract clause. This clause is guaranteed to represent the query expression, which means, that as long as the optimization rules were implemented correctly, objects that contain relevant data will never be skipped. Accordingly, to add an optimization rule, the only thing that needs to be done is to implement the rule logic itself—all other work is done by the skipping framework.

Figure 4:
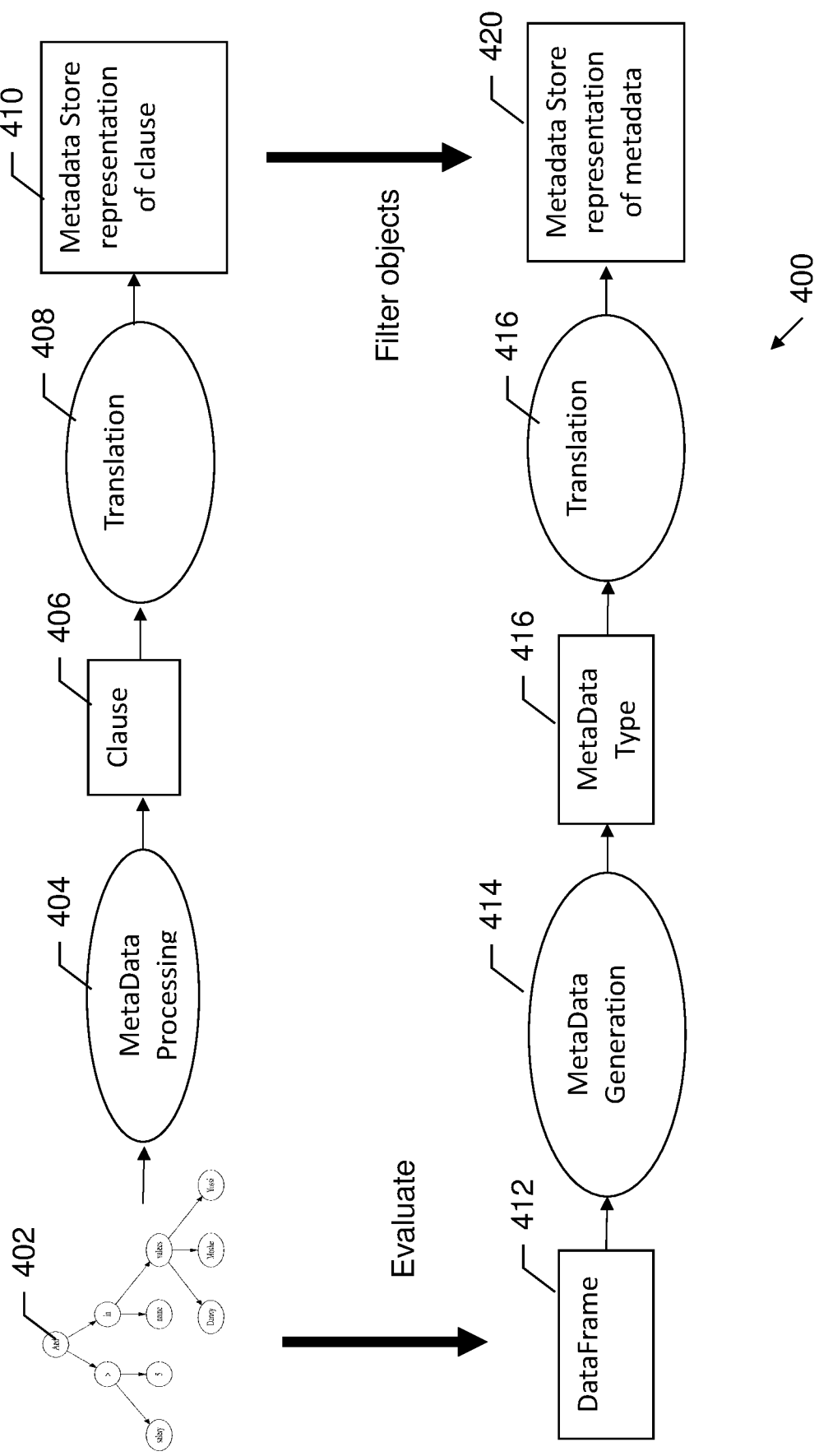
FIG. 4 is an exemplary flow diagram of a process of operation according to embodiments of the present systems and methods.
Figure 5:
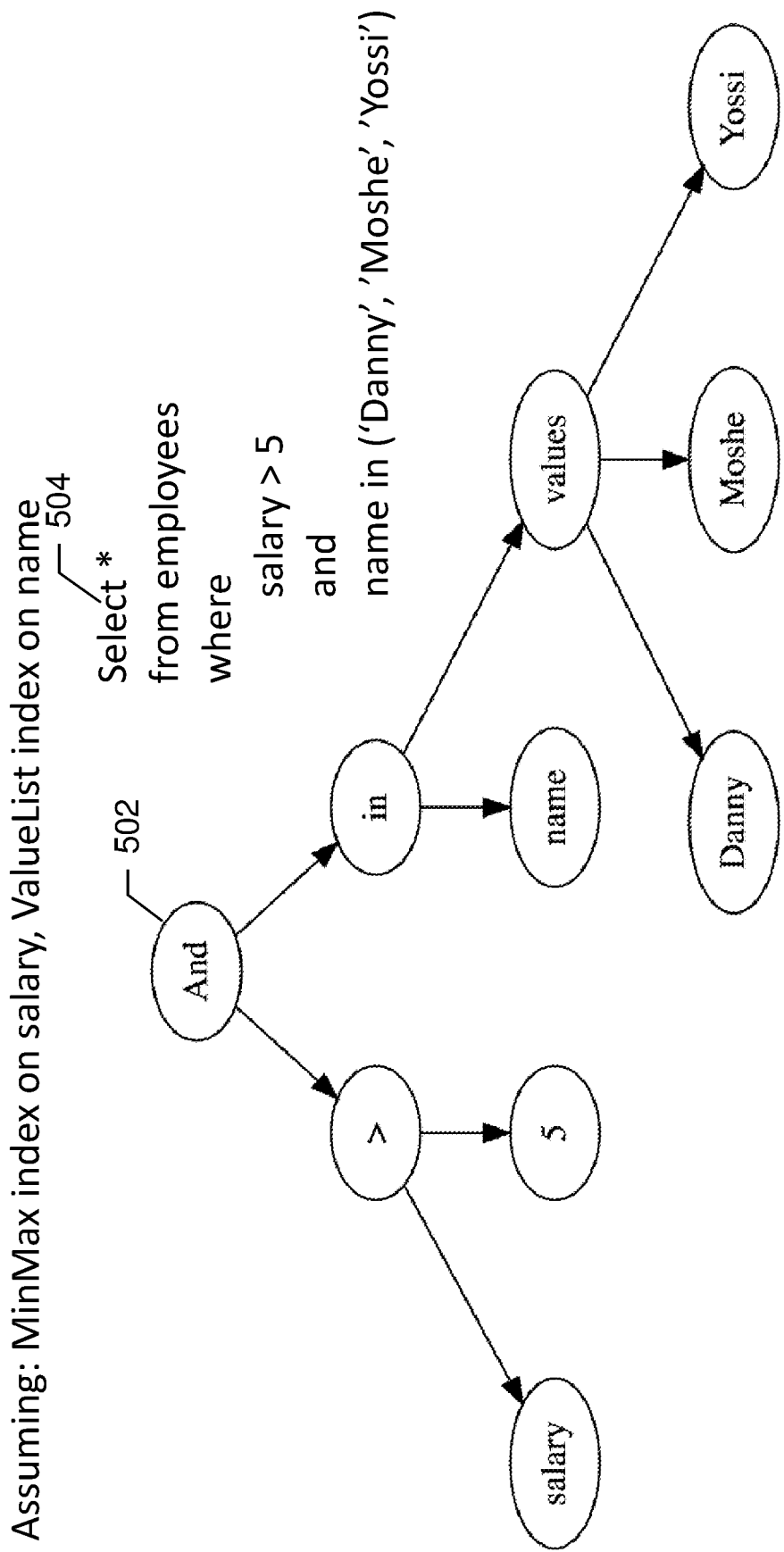
FIG. 5 illustrates an example of a definition of a query expression according to embodiments of the present systems and methods.
Figure 6:
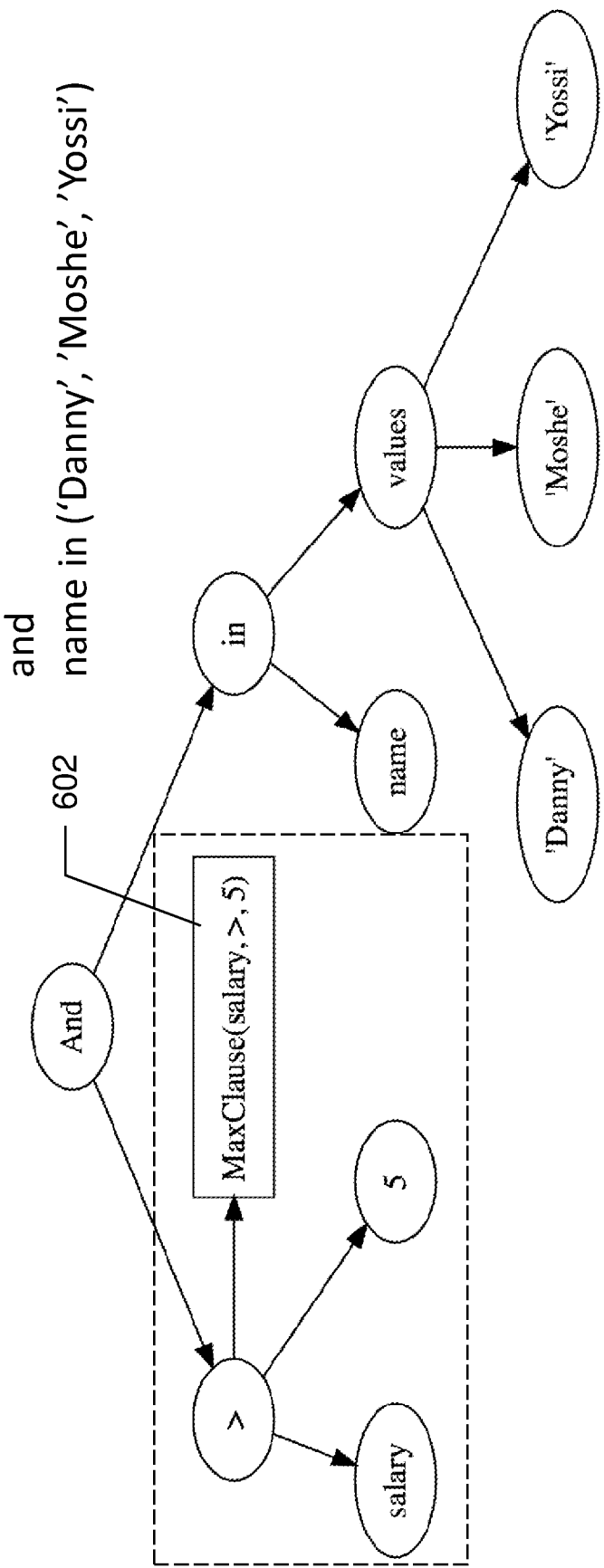
FIG. 6 illustrates an example of modification of a query expression according to embodiments of the present systems and methods.
Figure 7:
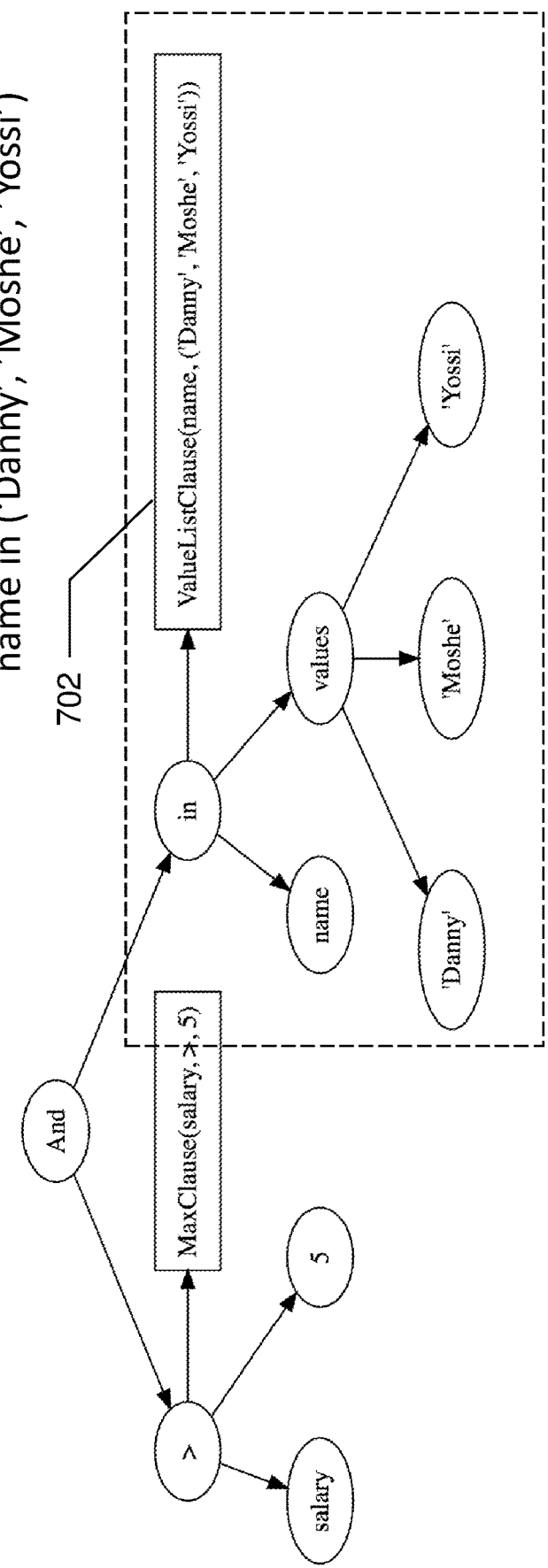
FIG. 7 illustrates an example of modification of a query expression according to embodiments of the present systems and methods.
Figure 8:
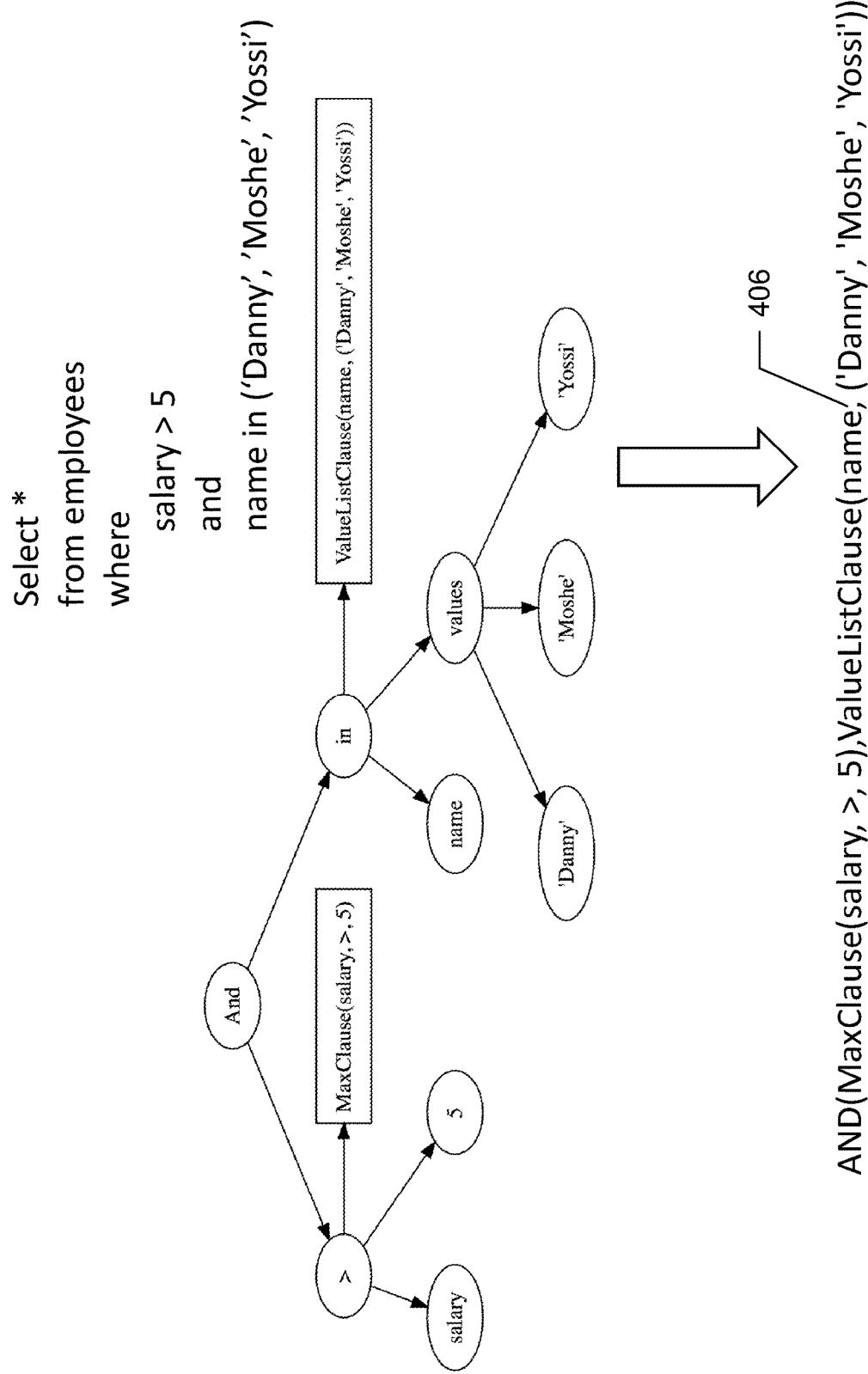
FIG. 8 illustrates an example of a clause that may be generated according to embodiments of the present systems and methods.

An exemplary process of operation 400 of the present systems and methods is shown in FIG. 4. Process 400 starts with definition of a query expression 402, as shown in FIG. 5 in expression tree form at 502 and SQL form at 504. In this example, it is assumed that existing data skipping indexes include a MinMax index on salary and a ValueList index on name. At 404, metadata processing may be performed to generate a representation of a clause 406 that represents query expression 502, 504. That is, query expression 402 may be modified to form a clause by modifying query expression 402 to refer to the relevant data skipping indexes. For example, as shown in FIG. 6, the query expression may be modified by being labeled with a filter 602 referring to the MinMax index on salary. Likewise, as shown in FIG. 7, the query expression may be modified by being labeled with a filter 702 referring to the ValueList index on name. An example of a clause 406 that may be generated is shown in FIG. 8.

Figure 9:
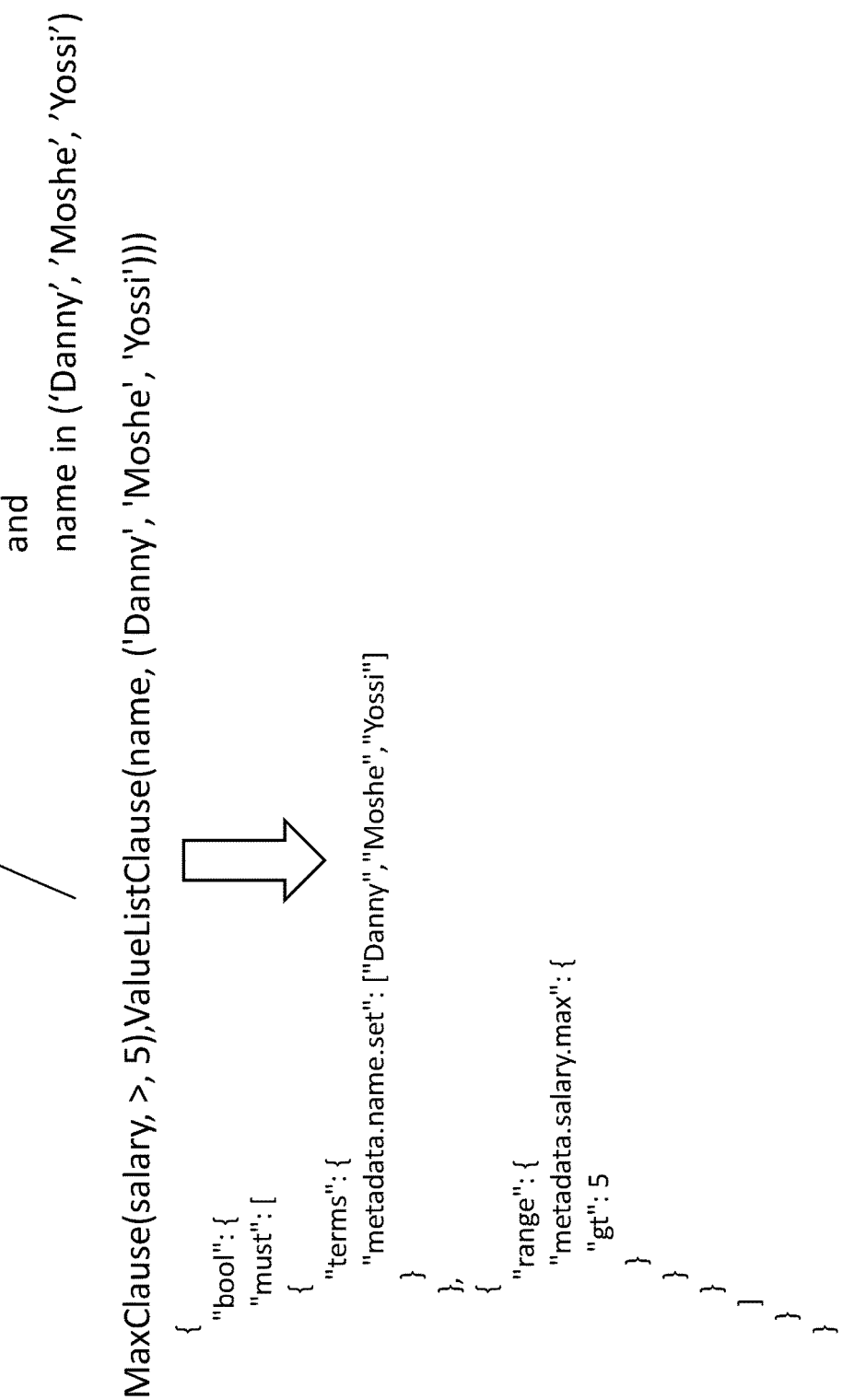
FIG. 9 illustrates an example of translation of a clause to form a metadata store representation according to embodiments of the present systems and methods.

Returning to FIG. 4, at 408, the generated clause may be translated to form a metadata store representation 410 of clause 406. An example of translation of clause 406 to form a metadata store representation 410, using, for example, the ES metadata store, is shown in FIG. 9. When a query corresponding to query expression 402 is performed, the metadata store representation 410 may be used to perform the query using the data skipping indexes that the query expression has been modified to refer to. The processing shown at 402 to 410, may, for example, be performed by expression tree processing 122, abstract clause generation 124, translation 126, and index generation and maintenance 128, shown in FIG. 1.

To generate a data skipping index, a query expression, such as 402, may be evaluated relative to a representation of a row subset 412, such as a Spark DataFrame. Metadata Generation interface 414 may provide the capability to transform a representation of the row subset 412, such as a Spark DataFrame, to a MetaDataType 416 defined by extensible data types interface 202, shown in FIG. 2. A translation interface 416 may provide the capability for the logical representation of summary metadata to be translated to a physical representation 420 dependent on the specific metadata store used, and may be stored in metadata storage 116, shown in FIG. 2. Once the above-described data is defined, a data skipping index for a given dataset may be created. Once created, a data skipping index may be referred to by a filter, which may be used to modify a query expression 402 to perform the query using the data skipping indexes that the query expression has been modified to refer to.

Figure 10:
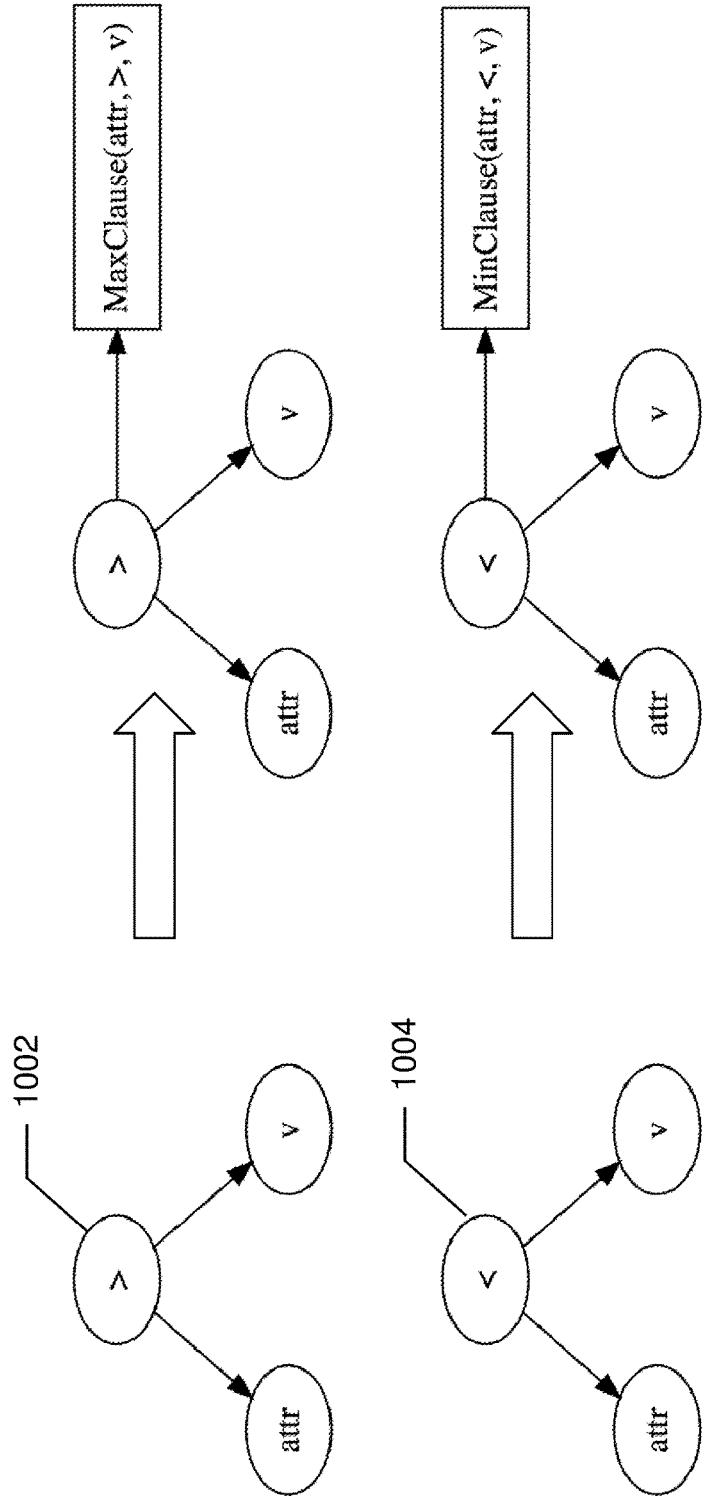
FIG. 10 illustrates an example of a MinMax filter according to embodiments of the present systems and methods.
Figure 11:
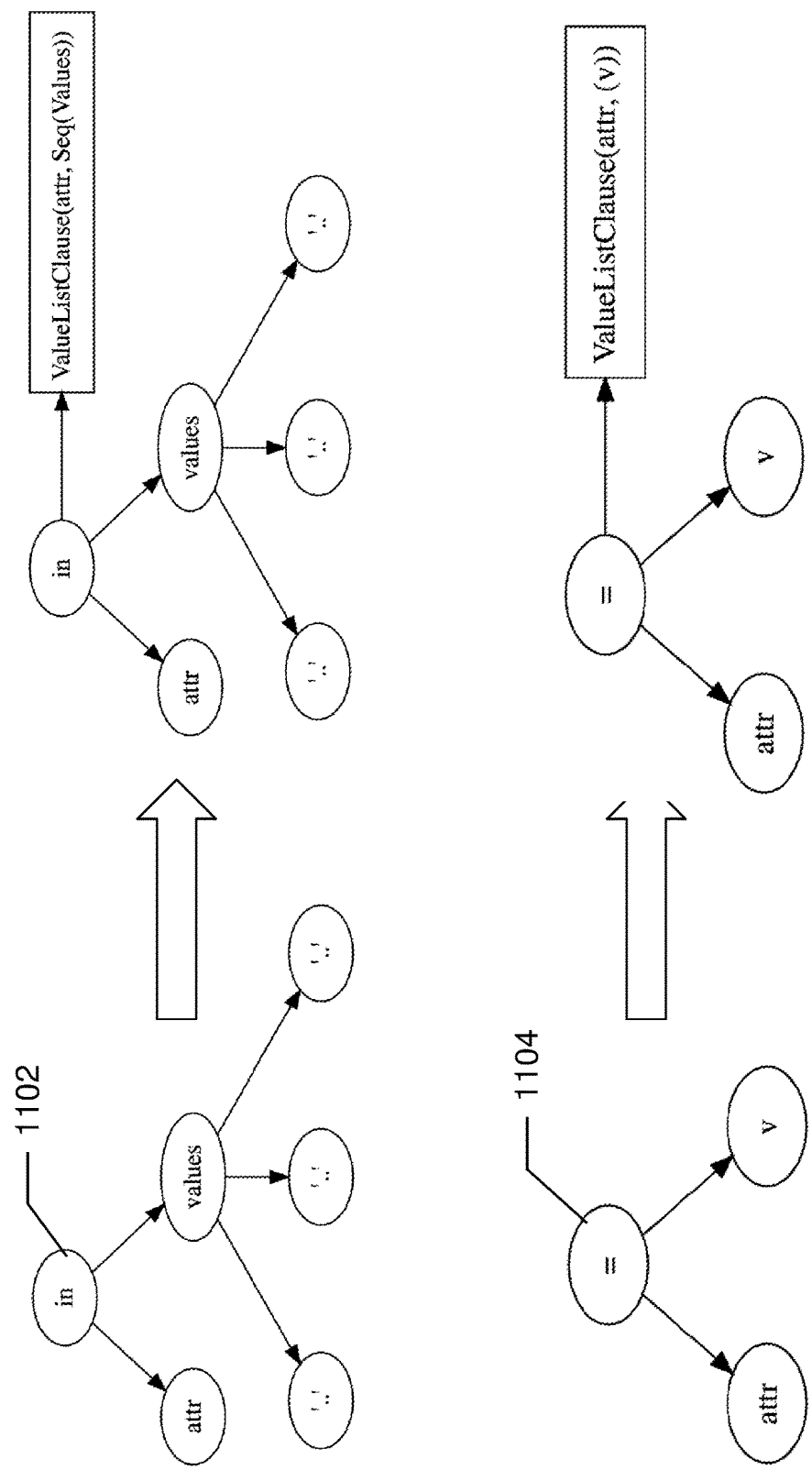
FIG. 11 illustrates an example of a ValueList filter according to embodiments of the present systems and methods.
Figure 12:
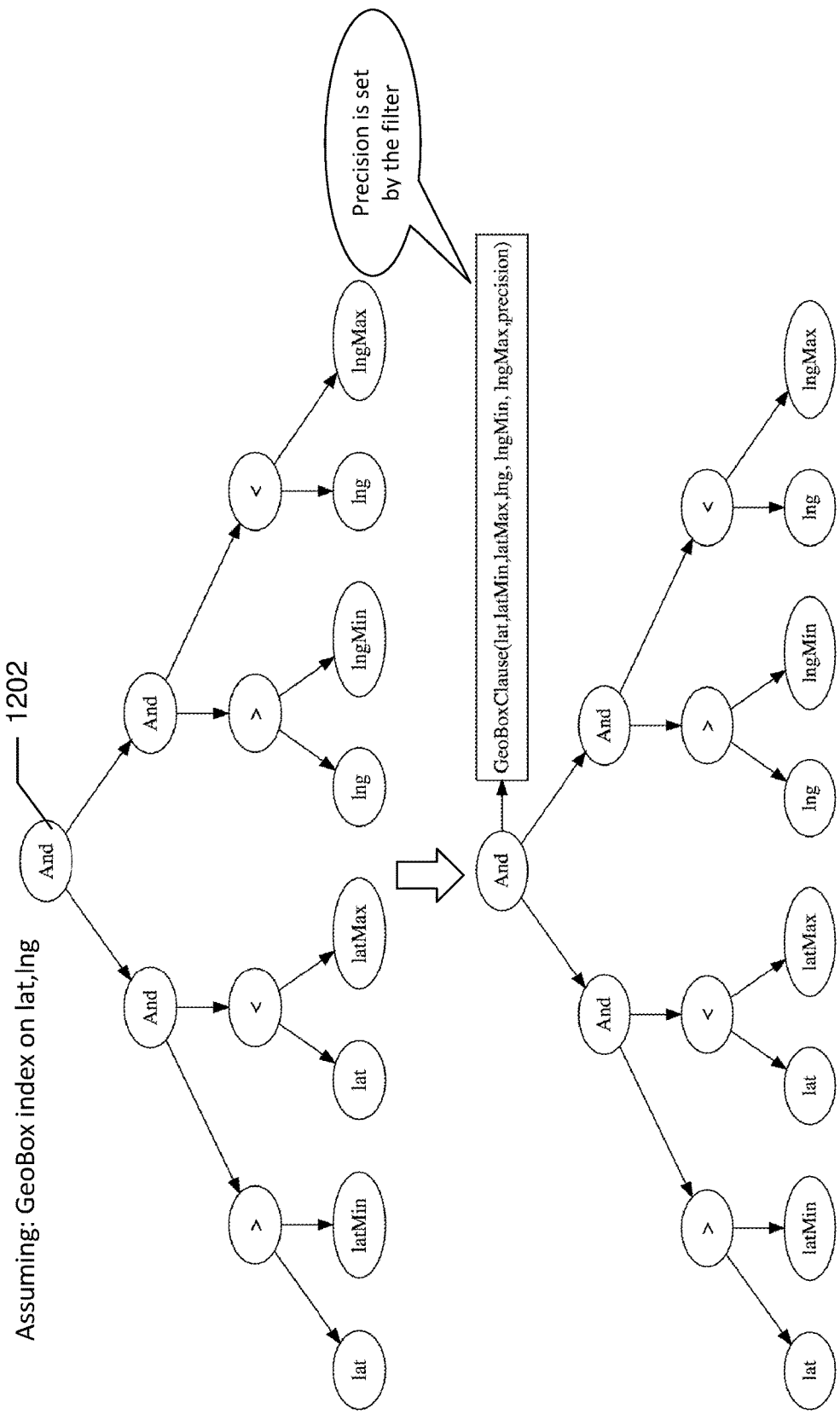
FIG. 12 illustrates an example of a GeoBox filter according to embodiments of the present systems and methods.

The present techniques may use any type of filter desired. Examples of such filters are shown in FIGS. 10-12. FIG. 10 shows an example of a MinMax Filter, including a Max Filter implementation 1002 and Min Filter implementation 1004, assuming a MinMax index on the selected attribute. FIG. 11 shows an example of a ValueList Filter, including an In Filter implementation 1102 and Equals Filter implementation 1404, assuming a ValueList index on the selected attribute. FIG. 12 shows an example of a GeoBox Filter 1202, which looks for a unified GeoBox bounding box in a direct conjunctive path, assuming a GeoBox index on the latitude and longitude.

In addition to pre-defined filters, the present techniques may be used with custom filters, which may be defined, for example, by extending an abstract filter class with code implementing the desired filter functionality. This may provide the capability to capture any structure in the tree and add abstract clauses, which may be useful, for example, for UDFs and the SQL predicate LIKE.

It is to be noted that embodiments of the present systems and methods may be applied to any type of structured, semi-structured, or unstructured data. Further, for embodiments that are applied to tabular data, such embodiments may utilize indexes that are related to multiple columns. For example, GeoBox bounding box data may utilize indexes on multiple columns, such as both latitude and longitude. Likewise, for any type of data that may utilize a "feature" index, the feature index may be related to multiple columns.

Figure 14:
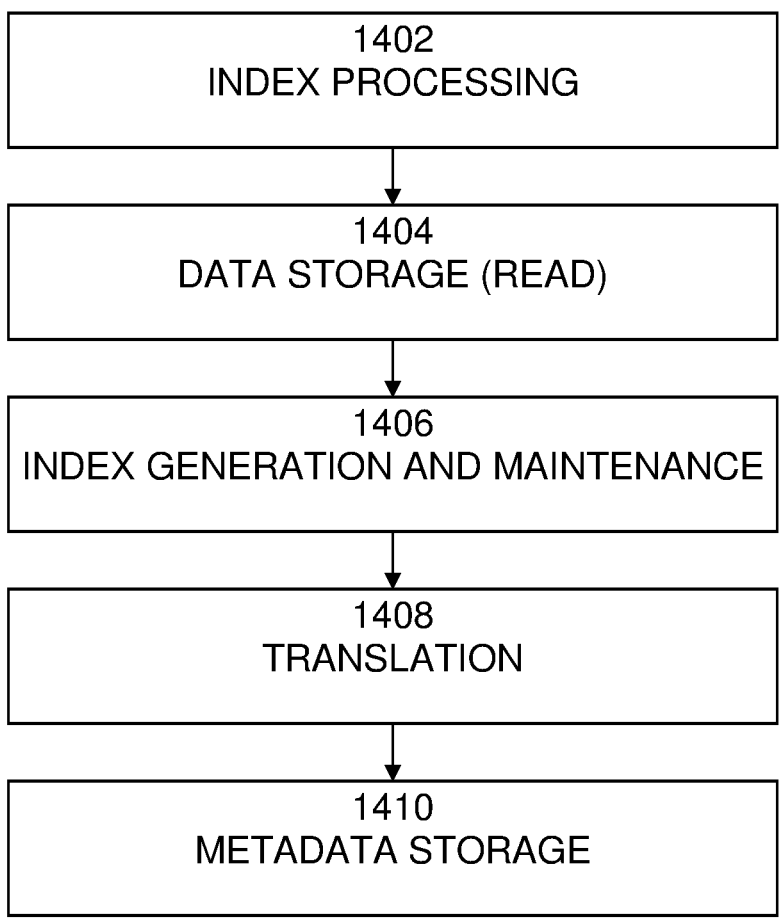
FIG. 14 is an exemplary flow diagram of a process of index creation based on an existing data flow according to embodiments of the present systems and methods.

An exemplary process 1400 of index creation based on an existing data flow is shown in FIG. 14. It is best viewed in conjunction with FIG. 1. Process 1400 may utilize and interact with applications 108, other systems 110, and users 112, as well as data processing system 102. Process 1400 begins with 1402, in which index processing may be performed. Index processing 1402 may provide the capability to transform a representation of a row subset to a defined MetaDataType. At 1404, at least a portion of a corresponding dataset may be read from data storage 104. At 1406, index generation and maintenance 128 may generate an index implementing the defined data skipping for the dataset. At 1408, translation 126 may translate the logical representation of summary metadata to a physical representation dependent on the specific metadata store used, and, at 1410, may be stored in metadata storage 116.

Figure 15:
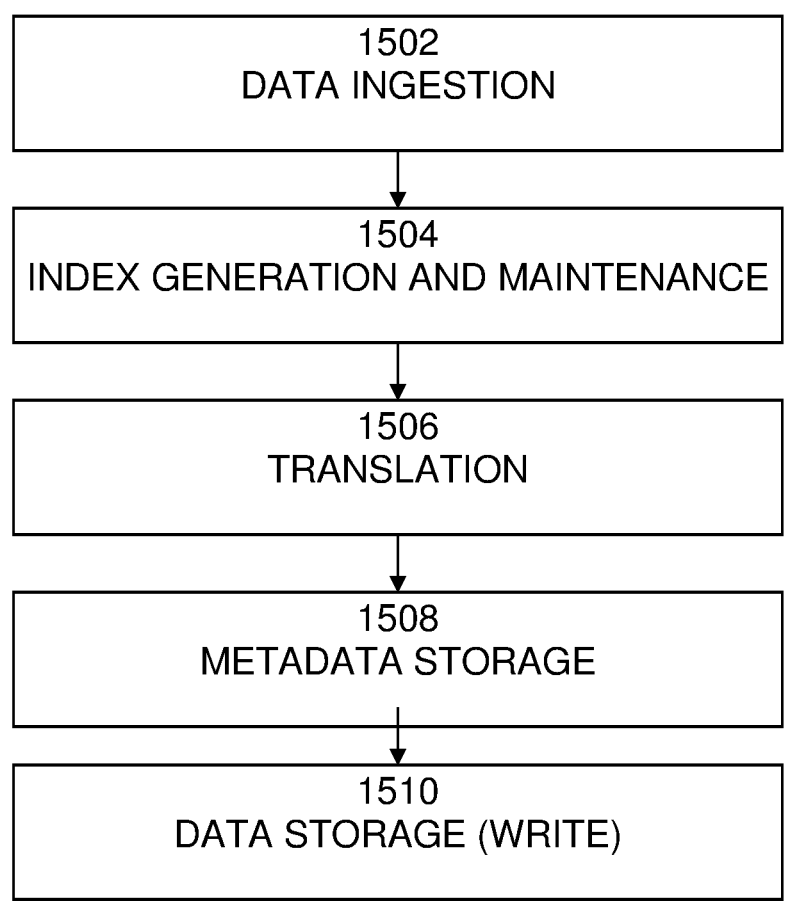
FIG. 15 is an exemplary flow diagram of a process of index creation based on an ingested data flow according to embodiments of the present systems and methods.

An exemplary process 1500 of query processing flow is shown in FIG. 15. It is best viewed in conjunction with FIG. 1. Process 1500 may utilize and interact with applications 108, other systems 110, and users 112. Process 1500 begins with 1502, in which data ingestion may be performed. Data ingestion 1502 may utilize data ingestion system 114 to receive and process new data. At 1504, index generation and maintenance 128 may generate an index implementing the defined data skipping for the new data being ingested. At 1506, translation 126 may translate the logical representation of summary metadata to a physical representation dependent on the specific metadata store used, and, at 1508, may be stored in metadata storage 116. At 1510, the ingested data may be stored to data storage 104, as indexed by the newly generated index.

Figure 16:
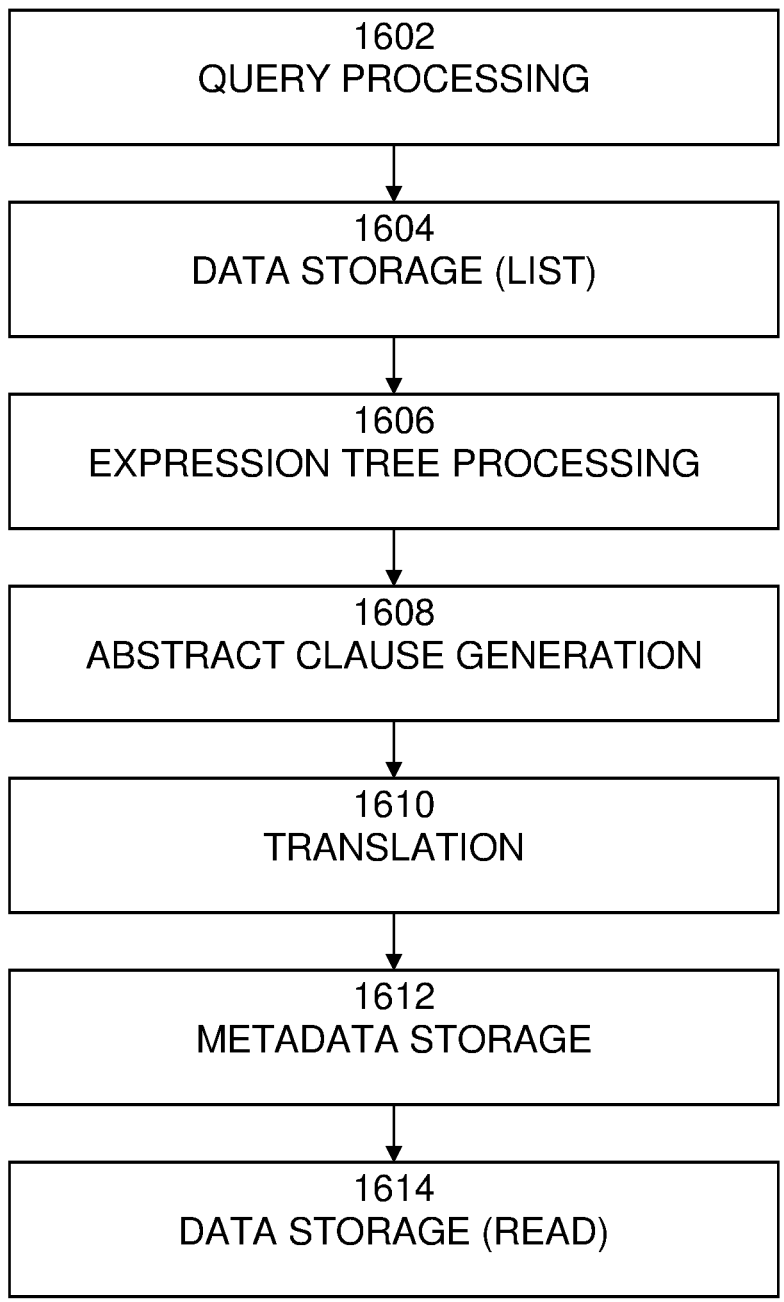
FIG. 16 is an exemplary flow diagram of a process of query processing flow according to embodiments of the present systems and methods.

An exemplary process 1600 of index creation based on an existing data flow is shown in FIG. 16. It is best viewed in conjunction with FIG. 1. Process 1600 may utilize and interact with applications 108, other systems 110, and users 112, as well as data processing system 102. Process 1600 begins with 1602, in which query processing may be performed. Query processing 1602 may perform processing of database or other processing queries, and creation, maintenance, and processing of indexes, which may be used in processing the queries. At 1604, data storage 104 may be accessed to obtain a list. At 1606, expression tree processing 122 may accept a query expression, for example in expression tree form, but also in SQL form, and perform metadata processing of the query expression. At 1608, abstract clause generation 124 may generate an abstract representation of a clause that refers to the relevant data skipping indexes. At 1610, translation 126 may translate the logical representation of summary metadata to a physical representation dependent on the specific metadata store used, and, at 1612, may be stored in metadata storage 116. At 1614, at least a portion of a corresponding dataset may be read from data storage 104.

Registration 120 may provide the capability to extending the system by adding support for new UDFs and Metadata Index Types in extensible data skipping framework 106 using an extensible data skipping API. Such extension may utilize and interact with applications 108, other systems 110, and users 112, as well as data processing system 102.

Figure 13:
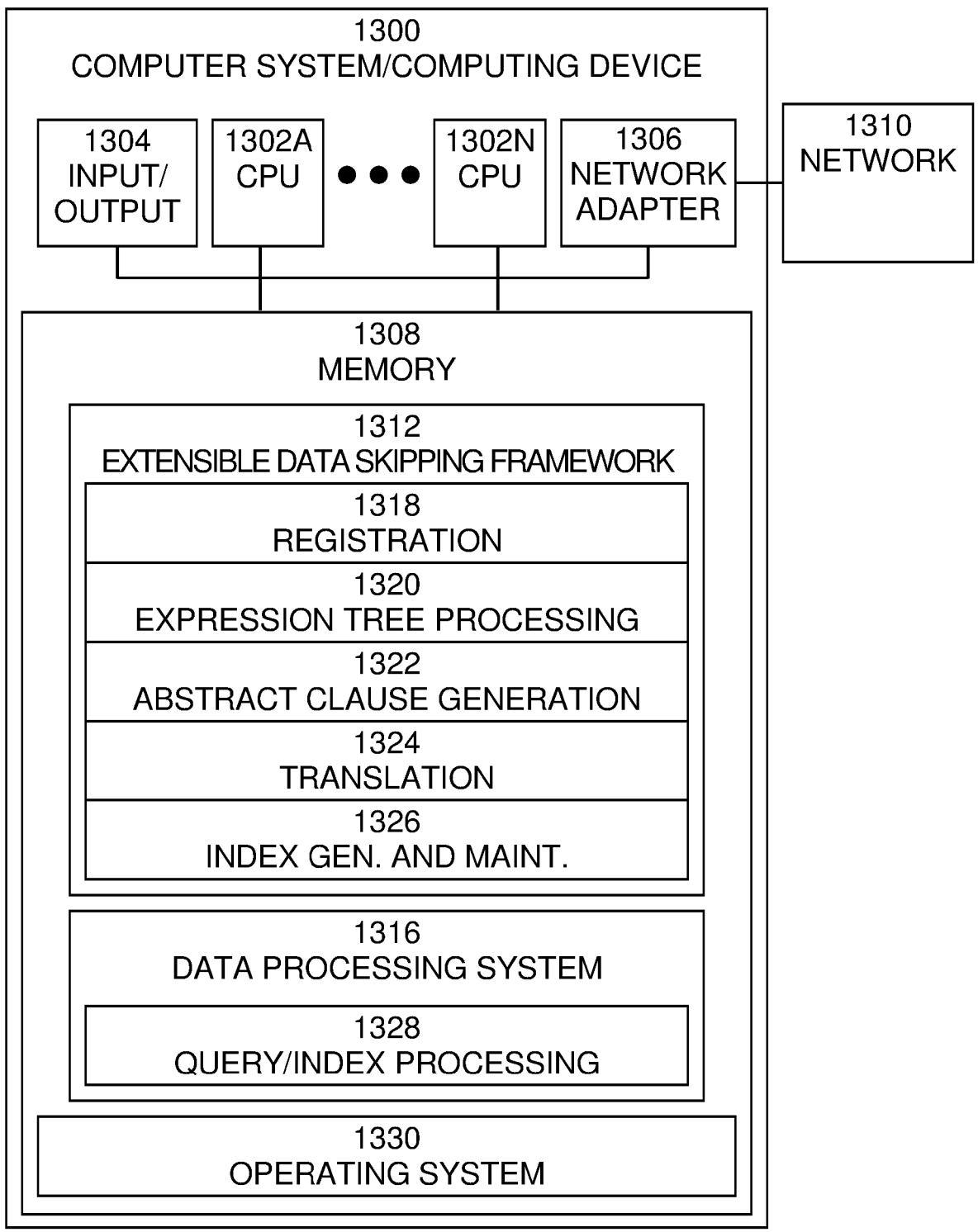
FIG. 13 is an exemplary block diagram of a computer system in which processes involved in the embodiments described herein may be implemented.

An exemplary block diagram of a computer system/computing device 1300, in which processes involved in the embodiments described herein may be implemented, is shown in FIG. 13. Computer system/computing device 1300 may be implemented using one or more programmed general-purpose computer systems, such as embedded processors, systems on a chip, personal computers, workstations, server systems, and minicomputers or mainframe computers, mobile devices, such as smartphones or tablets, or in distributed, networked computing environments. Computer system/computing device 1300 may include one or more processors (CPUs) 1302A-1302N, input/output circuitry 1304, network adapter 1306, and memory 1308. CPUs 1302A-1302N execute program instructions in order to carry out the functions of the present communications systems and methods. Typically, CPUs 1302A-1302N are one or more microprocessors, such as an INTEL CORE® processor or an ARM® processor. FIG. 13 illustrates an embodiment in which computer system/computing device 1302 is implemented as a single multi-processor computer system/computing device, in which multiple processors 1302A-1302N share system resources, such as memory 1308, input/output circuitry 1304, and network adapter 1306. However, the present communications systems and methods also include embodiments in which computer system/computing device 1302 is implemented as a plurality of networked computer systems, which may be single-processor computer system/computing devices, multi-processor computer system/computing devices, or a mix thereof.

Input/output circuitry 1304 provides the capability to input data to, or output data from, computer system/computing device 1302. For example, input/output circuitry may include input devices, such as keyboards, mice, touchpads, trackballs, scanners, analog to digital converters, etc., output devices, such as video adapters, monitors, printers, biometric information acquisition devices, etc., and input/output devices, such as, modems, etc. Network adapter 1306 interfaces device 1300 with a network 1310. Network 1310 may be any public or proprietary LAN or WAN, including, but not limited to the Internet.

Memory 1308 stores program instructions that are executed by, and data that are used and processed by, CPU 1302 to perform the functions of computer system/computing device 1302. Memory 1308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1308 may vary depending upon the function that computer system/computing device 1302 is programmed to perform. In the example shown in FIG. 13, exemplary memory contents are shown representing routines and data for embodiments of the processes described above. For example, in FIG. 13, the memory contents for both a computer system including extensible data skipping API and a database management system are shown. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 13, memory 1308 may include software code and data for extensible data skipping framework 1312 and for database management system 1316. Extensible data skipping framework 1312 may include extensible data skipping interface routines 1318, and predicate specification interface routines 1320. Extensible data skipping interface routines 1318 may include software routines to implement support for new types of summary metadata and support for new data skipping index types, and may output data skipping indexes and associated metadata. Extensible data skipping framework 106 may include registration 1320, expression tree processing 1320, abstract clause generation 1322, translation 1324, and index generation and maintenance 1326. Registration 1320 may provide the capability to extending the system by adding support for new UDFs and Metadata Index Types in extensible data skipping framework 106 using an extensible data skipping API. Expression tree processing 1320 may accept a query expression, for example in expression tree form, but also in SQL form, and perform metadata processing of the query expression so that abstract clause generation 1322 may generate an abstract representation of a clause that refers to the relevant data skipping indexes. Translation 1324 may translate the abstract clause to form a metadata representation of the clause that refers to the relevant data skipping indexes. The metadata representation may be stored in metadata storage. Index generation and maintenance 1326 may generate and maintain the data skipping indexes.

Data processing system 1316 may include data query/index processing 1328 which may handle processing of database or other processing queries, using data skipping indexes in processing the queries. Operating system 1330 may provide overall system functionality.

As shown in FIG. 13, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
   receiving a query, at a computer system comprising a processor, memory accessible by the processor, and computer program instructions stored in the memory and executable by the processor;
   modifying, at the computer system, the received query to utilize at least one data skipping index to evaluate at least one criterion of the query, wherein the at least one data skipping index comprises an index on at least one attribute of data that excludes at least a portion of those data items that do not meet the at least one criterion, wherein the at least one data skipping index relates to a newly added data type, wherein the at least one data skipping index is generated by receiving from the application programming interface, at the computer system, information defining a data skipping index type, receiving from the application programming interface, at the computer system, information interpreting the at least one criterion, generating, at the computer system, metadata relating to the defined data skipping index type and the defined at least one criterion, and generating, at the computer system, the at least one data skipping index based on the generated metadata, and wherein at least one of the at least one data skipping index or a mapping from the at least one criterion to the at least one data skipping index is generated based on information received from an application programming interface; and
   evaluating, at the computer system, the query.

2. The method of claim 1, wherein the received query is represented as an expression tree, and the expression tree is modified by utilizing an optimization rule to label at least one node of the expression tree with a clause representing skipping requirements for the at least one criterion and referring to at least one data skipping index.

3. The method of claim 2, wherein the at least one criterion is a Structured Query Language (SQL) predicate.

4. The method of claim 1, wherein the at least one data skipping index is generated by:
   receiving from the application programming interface, at the computer system, information defining a plurality of data skipping index types;
   receiving from the application programming interface, at the computer system, information defining a plurality of criteria;
   generating, at the computer system, metadata relating to each defined data skipping index type and each defined criterion;
   combining, at the computer system, the metadata relating to each defined data skipping index type and each defined criterion to form metadata relating to the plurality of defined data skipping index types and the plurality of defined criteria; and generating, at the computer system, the at least one data skipping index based on the generated metadata.

5. The method of claim 4, wherein the received query is represented as an expression tree, and the expression tree is modified by utilizing a plurality of optimization rules to label each of a plurality of nodes of the expression tree with a clause representing skipping requirements for a criterion and referring to a data skipping index.

6. The method of claim 5, wherein each criterion is a Structured Query Language (SQL) predicate.

7. A system comprising a processor, memory accessible by the processor, and computer program instructions stored in the memory and executable by the processor to perform:

receiving a query;

modifying the received query to utilize at least one data skipping index to evaluate at least one criterion of the query, wherein the at least one data skipping index comprises an index on at least one attribute of data that excludes at least a portion of those data items that do not meet the at least one criterion, wherein the at least one data skipping index relates to a newly added data type, wherein the at least one data skipping index is generated by receiving from the application programming interface, at the computer system, information defining a data skipping index type, receiving from the application programming interface, at the computer system, information interpreting the at least one criterion, generating, at the computer system, metadata relating to the defined data skipping index type and the defined at least one criterion, and generating, at the computer system, the at least one data skipping index based on the generated metadata, and wherein at least one of the at least one data skipping index or a mapping from the at least one criterion to the at least one data skipping index is generated based on information received from an application programming interface; and evaluating the query.

8. The system of claim 7, wherein the received query is represented as an expression tree, and the expression tree is modified by utilizing an optimization rule to label at least one node of the expression tree with a clause representing skipping requirements for the at least one criterion and referring to at least one data skipping index.

9. The system of claim 8, wherein the at least one criterion is a Structured Query Language (SQL) predicate.

10. The system of claim 7, wherein the at least one data skipping index is generated by:

receiving from the application programming interface information defining a plurality of data skipping index types;

receiving from the application programming interface information defining a plurality of criteria;

generating metadata relating to each defined data skipping index type and each defined criterion;

combining the metadata relating to each defined data skipping index type and each defined criterion to form metadata relating to the plurality of defined data skipping index types and the plurality of defined criteria; and generating the at least one data skipping index based on the generated metadata.

11. The system of claim 10, wherein the received query is represented as an expression tree, and the expression tree is modified by utilizing a plurality of optimization rules to label each of a plurality of nodes of the expression tree with a clause representing skipping requirements for a criterion and referring to a data skipping index.

12. The system of claim 11, wherein each criterion is a Structured Query Language (SQL) predicate.

13. A computer program product comprising a non-transitory computer readable storage having program instructions embodied therewith, the program instructions executable by a computer, to cause a computer to perform a method comprising:

receiving a query;

modifying the received query to utilize at least one data skipping index to evaluate at least one criterion of the query, wherein the at least one data skipping index comprises an index on at least one attribute of data that excludes at least a portion of those data items that do not meet the at least one criterion, wherein the at least one data skipping index relates to a newly added data type, wherein the at least one data skipping index is generated by receiving from the application programming interface, at the computer system, information defining a data skipping index type, receiving from the application programming interface, at the computer system, information interpreting the at least one criterion, generating, at the computer system, metadata relating to the defined data skipping index type and the defined at least one criterion, and generating, at the computer system, the at least one data skipping index based on the generated metadata, and wherein at least one of the at least one data skipping index or a mapping from the at least one criterion to the at least one data skipping index is generated based on information received from an application programming interface; and evaluating the query.

14. The computer program product of claim 13, wherein the received query is represented as an expression tree, and the expression tree is modified by utilizing an optimization rule to label at least one node of the expression tree with a clause representing skipping requirements for the at least one criterion and referring to at least one data skipping index.

15. The computer program product of claim 13, wherein the at least one data skipping index is generated by:

receiving from the application programming interface information defining a plurality of data skipping index types;

receiving from the application programming interface information defining a plurality of criteria;

generating metadata relating to each defined data skipping index type and each defined criterion;

combining the metadata relating to each defined data skipping index type and each defined criterion to form metadata relating to the plurality of defined data skipping index types and the plurality of defined criteria; and generating the at least one data skipping index based on the generated metadata.

16. The computer program product of claim 15, wherein the received query is represented as an expression tree, and the expression tree is modified by utilizing a plurality of optimization rules to label each of a plurality of nodes of the expression tree with a clause representing skipping requirements for a criterion and referring to a data skipping index.

17. The computer program product of claim 16, wherein each criterion is a Structured Query Language (SQL) predicate.

\* \* \* \* \*